(No Model.)
S. C. THOMPSON.
SURVEYOR'S TARGET.
No. 405,058. Patented June 11, 1889.
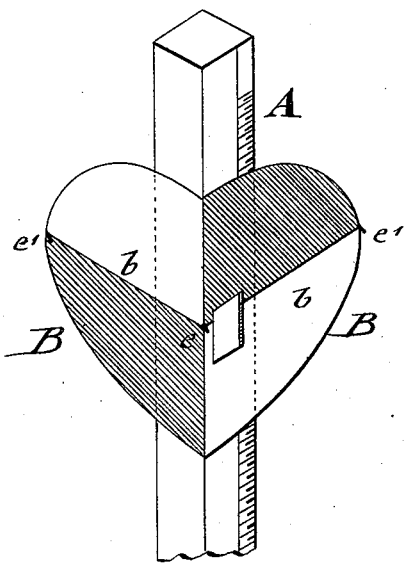
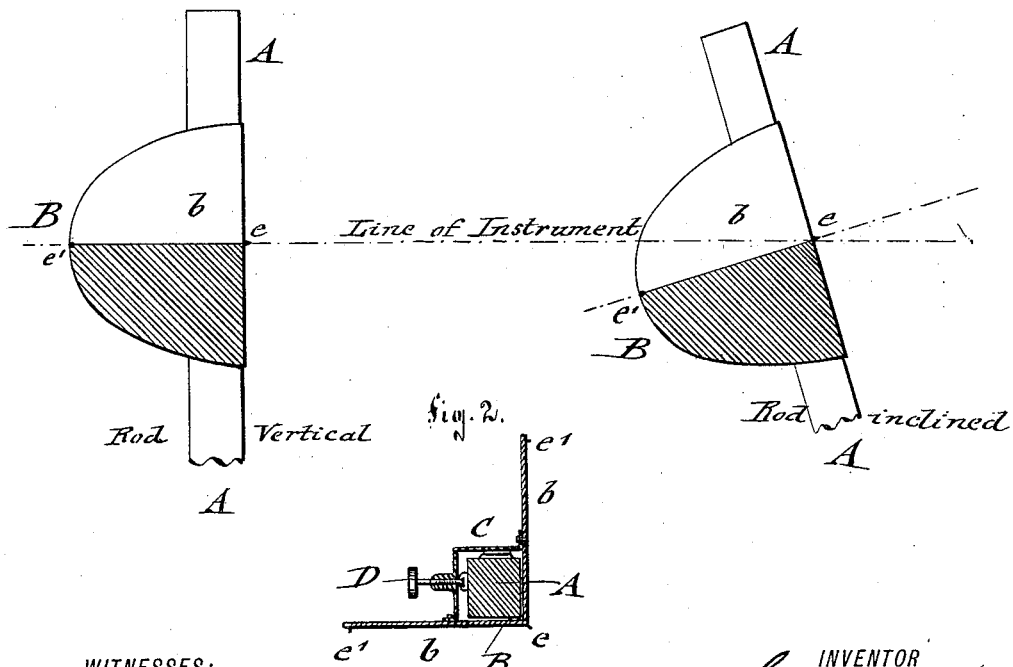

UNITED STATES PATENT OFFICE.

SAMUEL C. THOMPSON, OF NEW YORK, N. Y.

SURVEYOR'S TARGET.

SPECIFICATION forming part of Letters Patent No. 405,058, dated June 11, 1889.

Application filed February 26, 1889. Serial No. 301,182. (No model.)

*To all whom it may concern:*

Be it known that I, SAMUEL C. THOMPSON, of the city, county, and State of New York, a citizen of the United States, have invented certain new and useful Improvements in Surveyors' Targets, of which the following is a specification.

This invention relates to an improved leveling and offset target for surveyors, which will enable the surveyor to ascertain, while at the instrument, whether the leveling or offset rod is perpendicular to the line of sight, and which will also enable him to determine, when the rod is not perpendicular, which way to move it so as to make it assume a perpendicular position.

With the ordinary targets it is easy to determine whether the rod is held in vertical position sidewise, but it is very difficult to decide whether the rod is held out of the perpendicular position by leaning it in forward or backward direction, as when it is in such inclined position errors are introduced in leveling which should be avoided.

The invention consists of a target the two halves of which are arranged at right angles to each other and marked, in the same manner as the ordinary target, with a vertical and horizontal line. One-half of the target is provided with an opening to read off the graduation on the rod.

The invention consists, secondly, of a target formed of two halves, which are arranged at right angles to each other and applied by a suitable keeper and clamping-screw to the rod, one half being provided with an opening for reading off the graduation on the rod, and with a horizontal line extending over both halves of the target, and with pins at the point of intersection of the horizontal line with the angle of the two halves and at the outer ends of each half, as will be fully described hereinafter.

In the accompanying drawings, Figure 1 represents a perspective view of my improved surveyor's target. Fig. 2 is a horizontal section of the same; and Figs. 3 and 4 are side elevations of the target, showing the rod respectively in vertical and inclined positions. Similar letters of reference indicate corresponding parts.

A in the drawings represents a surveyor's leveling-rod, which is graduated in the usual manner, and B the target of the same, which is made of two halves $b$ $b$, said halves being arranged at right angles to each other and attached by a keeper C and clamp-screws D to the rod, so as to readily slide up and down on the same. The halves of the target are marked, in the same manner as the ordinary target, with a vertical and a horizontal dividing-line. When the rod is held plumb, the target appears to the man looking through the instrument like the ordinary target; but should the rod be inclined and the cross-hairs of the instrument be made to coincide with the intersection of the vertical and horizontal lines of the target the horizontal cross-hair of the instrument will be either above or below the horizontal line of the target at the rear end, according as the rod is inclined forward or backward, which is readily determined from the instrument. When the rod is used as an offset-rod, it gives with absolute certainty the perpendicular distance from the instrument-line to the point on which it is held. The graduations on the rod and target are the same as in ordinary leveling-rods. If it be desirable to arrange the target so that the rod-man can tell whether he is holding the rod plumb, and also to set the target when so near the instrument that the glass of the same cannot be focused, a small short pin $e$ is inserted at the point of intersection of the vertical and horizontal lines of the halves of the target, and additional pins $e'$ at the outer ends of the horizontal line of the same, which pins are used to sight by and determine when it is the line of sight.

My improved target is very simple in construction, and does not require any additional parts except the small pins, while it renders the work of leveling more accurate, inasmuch as the errors that heretofore have crept in in leveling by holding the rod in forwardly or backwardly inclined position can be readily recognized and obviated.

Having thus described my invention, I claim as new and desire to secure by Letters Patent—

1. A surveyor's target formed of two halves arranged at right angles to each other, substantially as set forth.

2. A surveyor's target formed of two halves arranged at right angles to each other and provided with vertical and horizontal intersecting lines, substantially as set forth.

3. A surveyor's target formed of two halves arranged at right angles to each other and provided with vertical and horizontal intersecting lines, and with pins at the intersection of said lines and at the outer ends of the horizontal line, substantially as set forth.

In testimony that I claim the foregoing as my invention I have signed my name in presence of two subscribing witnesses.

SAMUEL C. THOMPSON.

Witnesses:
CHARLES H. GRAHAM,
LEWIS W. SPENCER.